US011223872B2

(12) United States Patent
Fang et al.

(10) Patent No.: US 11,223,872 B2
(45) Date of Patent: *Jan. 11, 2022

(54) SET-TOP BOX WITH ENHANCED FUNCTIONALITY AND SYSTEM AND METHOD FOR USE OF SAME

(71) Applicant: Enseo, Inc., Plano, TX (US)

(72) Inventors: William C. Fang, Plano, TX (US); Thomas R. Miller, Plano, TX (US); Vanessa Ogle, Fairview, TX (US)

(73) Assignee: Enseo, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/036,934

(22) Filed: Sep. 29, 2020

(65) Prior Publication Data
US 2021/0014555 A1 Jan. 14, 2021

Related U.S. Application Data

(63) Continuation of application No. 16/209,690, filed on Dec. 4, 2018, now Pat. No. 10,791,359, which is a
(Continued)

(51) Int. Cl.
*H04N 21/422* (2011.01)
*H04N 21/41* (2011.01)
(Continued)

(52) U.S. Cl.
CPC ......... *H04N 21/4222* (2013.01); *G08C 17/02* (2013.01); *H04N 21/4126* (2013.01); *H04N 21/4131* (2013.01); *H04N 21/41265* (2020.08); *H04N 21/42202* (2013.01); *H04N 21/42204* (2013.01); *H04N 21/42208* (2013.01);
(Continued)

(58) Field of Classification Search
CPC ......... H04N 21/4222; H04N 21/42208; H04N 21/4126; H04N 21/42224; H04N 21/4131; H04N 21/42226; H04N 21/42207; H04N 21/4367; H04N 21/42202; G08C 2201/20; G08C 2201/30; G08C 2201/92; G08C 2201/93; H04W 4/008; H04W 4/21; H04W 4/80
See application file for complete search history.

(56) References Cited

U.S. PATENT DOCUMENTS 6,263,503 B1 * 7/2001 Margulis .......... H04N 21/43615
725/81
6,741,684 B2 5/2004 Kaars
(Continued)

*Primary Examiner* — Oschta I Montoya
(74) *Attorney, Agent, or Firm* — Scott Griggs; Griggs Bergen LLP

(57) ABSTRACT

A set-top box with enhanced functionality and system and method for use of the same are disclosed. In one embodiment of the set-top box system, first and second set-top boxes each include a housing securing a television input, a television output, a processor, a wireless transceiver, memory, and storage communicatively interconnected by a busing architecture. Each of the set-top boxes is connected to a display, such as a television. A syndication profile associated with the set-top boxes enables a proximate wireless-enabled interactive programmable device to control both displays via each of the set-top boxes.

14 Claims, 5 Drawing Sheets

Related U.S. Application Data continuation of application No. 15/990,358, filed on May 25, 2018, now Pat. No. 10,148,998, which is a continuation-in-part of application No. 15/857,310, filed on Dec. 28, 2017, now Pat. No. 10,136,176, which is a continuation of application No. 15/422,667, filed on Feb. 2, 2017, now Pat. No. 10,187,685, which is a continuation of application No. 15/162,823, filed on May 24, 2016, now abandoned, which is a continuation of application No. 14/876,571, filed on Oct. 6, 2015, now Pat. No. 9,351,029, which is a continuation of application No. 14/525,392, filed on Oct. 28, 2014, now Pat. No. 9,154,825, which is a continuation of application No. 14/177,876, filed on Feb. 11, 2014, now Pat. No. 8,875,195, which is a continuation of application No. 13/528,663, filed on Jun. 20, 2012, now Pat. No. 8,650,600.

(60) Provisional application No. 62/511,147, filed on May 25, 2017, provisional application No. 61/498,734, filed on Jun. 20, 2011.

(51) Int. Cl.
   *H04N 21/4367* (2011.01)
   *G08C 17/02* (2006.01)
   *H04W 4/21* (2018.01)
   *H04N 21/436* (2011.01)
   *H04N 21/4363* (2011.01)
   *H04W 4/80* (2018.01)
   *H04N 21/45* (2011.01)
   *H04N 21/475* (2011.01)

(52) U.S. Cl.
   CPC . *H04N 21/42224* (2013.01); *H04N 21/42226* (2013.01); *H04N 21/4367* (2013.01); *H04N 21/43615* (2013.01); *H04N 21/43637* (2013.01); *H04W 4/21* (2018.02); *G08C 2201/20* (2013.01); *G08C 2201/30* (2013.01); *G08C 2201/92* (2013.01); *G08C 2201/93* (2013.01); *H04N 21/42206* (2013.01); *H04N 21/42209* (2013.01); *H04N 21/42221* (2013.01); *H04N 21/4532* (2013.01); *H04N 21/4751* (2013.01); *H04W 4/80* (2018.02)

(56) References Cited

U.S. PATENT DOCUMENTS

| | | | |
|---|---|---|---|
| 7,109,974 | B2 | 9/2006 | Kempisty |
| 8,286,204 | B2 | 10/2012 | Fukuda et al. |
| 8,650,600 | B2 | 2/2014 | Ogle et al. |
| 8,818,272 | B2 * | 8/2014 | Paryani ............ H04M 1/72415 455/41.2 |
| 8,875,195 | B2 | 10/2014 | Ogle et al. |
| 9,154,825 | B2 | 10/2015 | Ogle et al. |
| 9,351,029 | B2 | 5/2016 | Ogle et al. |
| 10,148,998 | B2 | 12/2018 | Fang et al. |
| 2002/0059621 | A1 | 5/2002 | Thomas et al. |
| 2002/0143805 | A1 | 10/2002 | Hayes et al. |
| 2003/0073411 | A1 * | 4/2003 | Meade, II ............... G06F 3/033 455/70 |
| 2005/0005297 | A1 * | 1/2005 | Lee ......................... H04H 40/90 725/81 |
| 2005/0035846 | A1 | 2/2005 | Zigmond et al. |
| 2005/0097618 | A1 | 5/2005 | Arling et al. |
| 2005/0108751 | A1 | 5/2005 | Dacosta |
| 2005/0262535 | A1 * | 11/2005 | Uchida ............. H04N 21/4126 725/80 |
| 2006/0120518 | A1 * | 6/2006 | Baudino ............... H04L 67/303 379/91.02 |
| 2008/0088602 | A1 | 4/2008 | Hotelling |
| 2009/0327894 | A1 | 12/2009 | Rakib |
| 2010/0082485 | A1 | 4/2010 | Lin et al. |
| 2010/0082491 | A1 | 4/2010 | Rosenblatt et al. |
| 2010/0188279 | A1 | 7/2010 | Shamilian et al. |
| 2011/0007018 | A1 | 1/2011 | McKinley et al. |
| 2011/0067059 | A1 | 3/2011 | Johnston et al. |
| 2016/0269769 | A1 | 9/2016 | Ogle et al. |
| 2017/0150201 | A1 | 5/2017 | Ogle et al. |
| 2018/0124449 | A1 | 5/2018 | Ogle et al. |

* cited by examiner

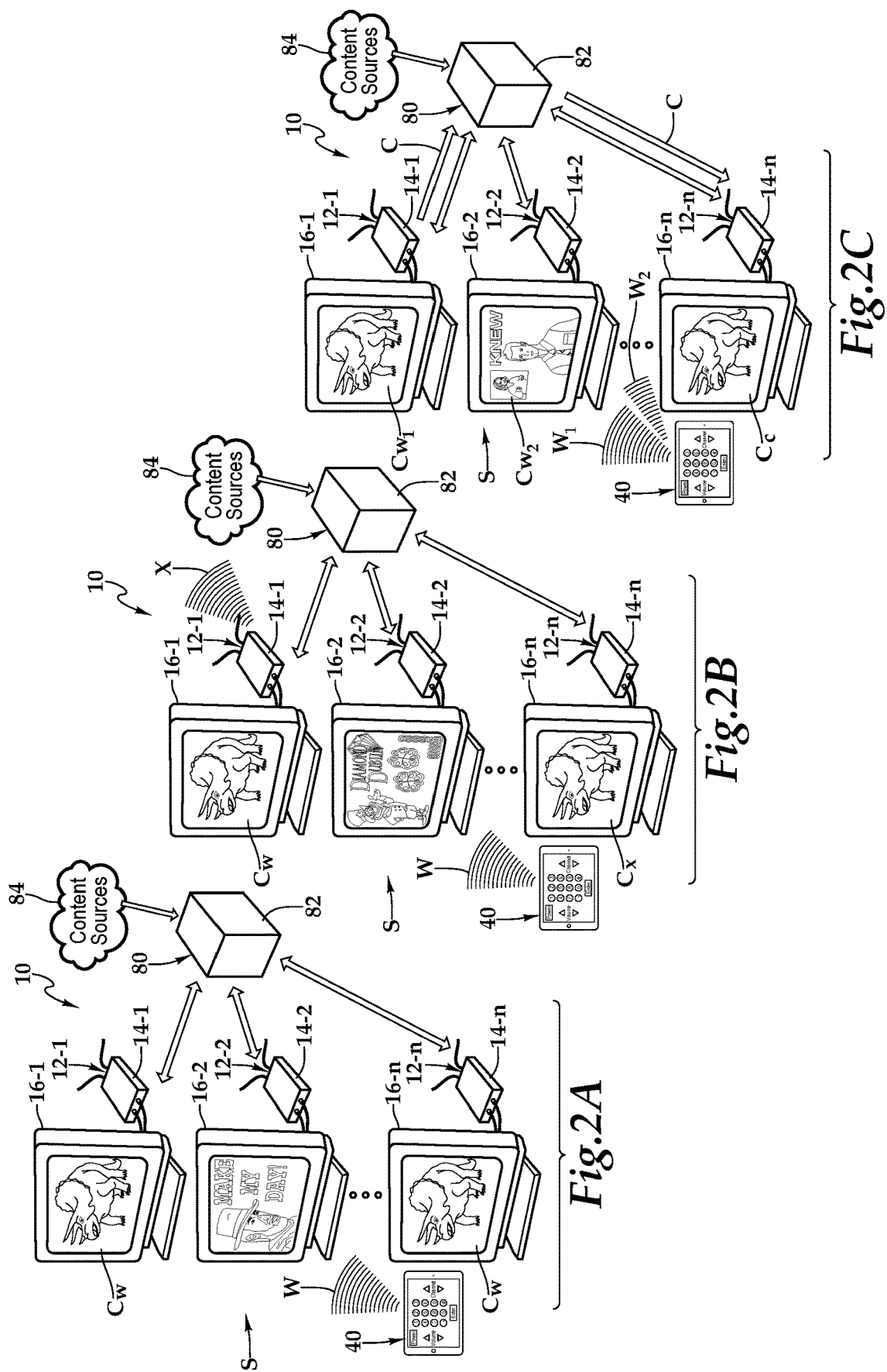

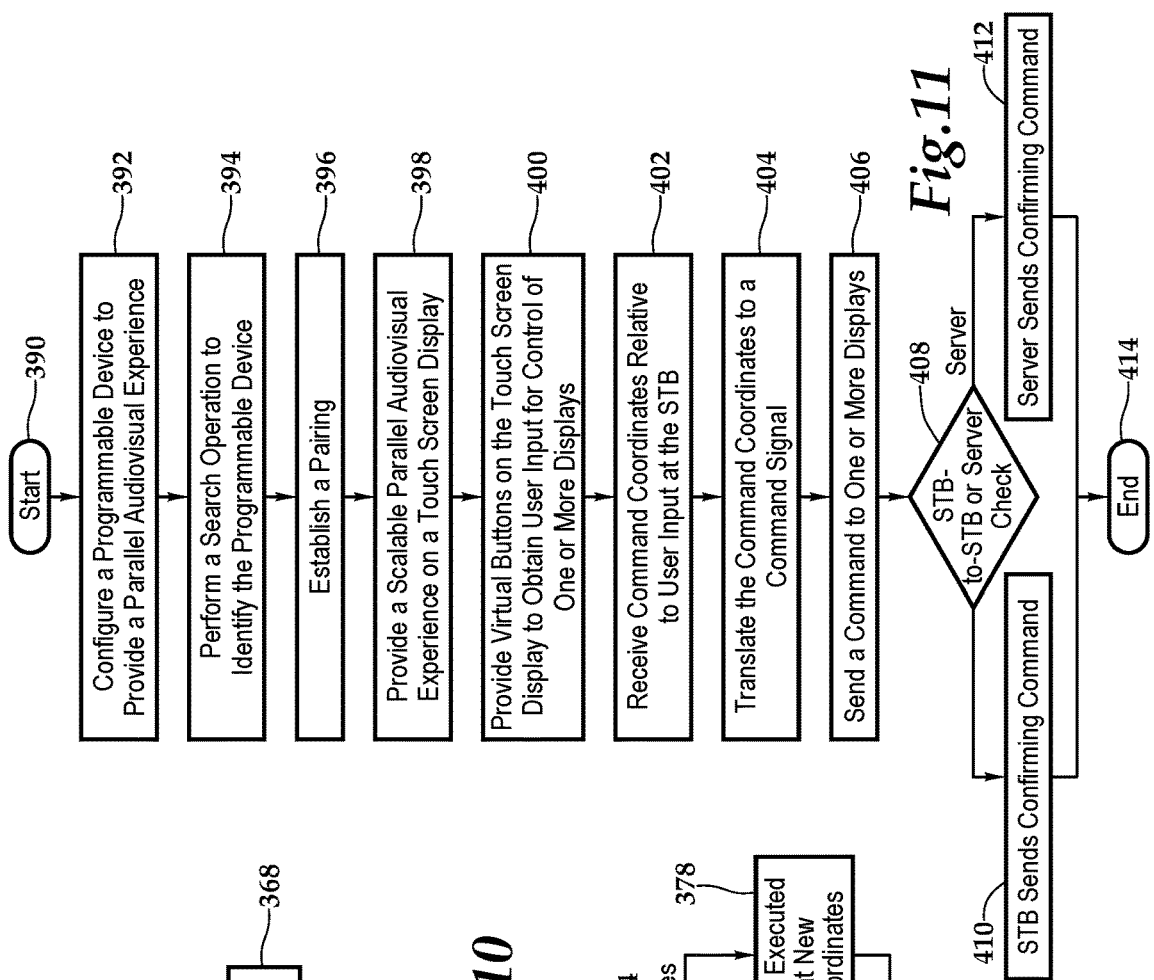
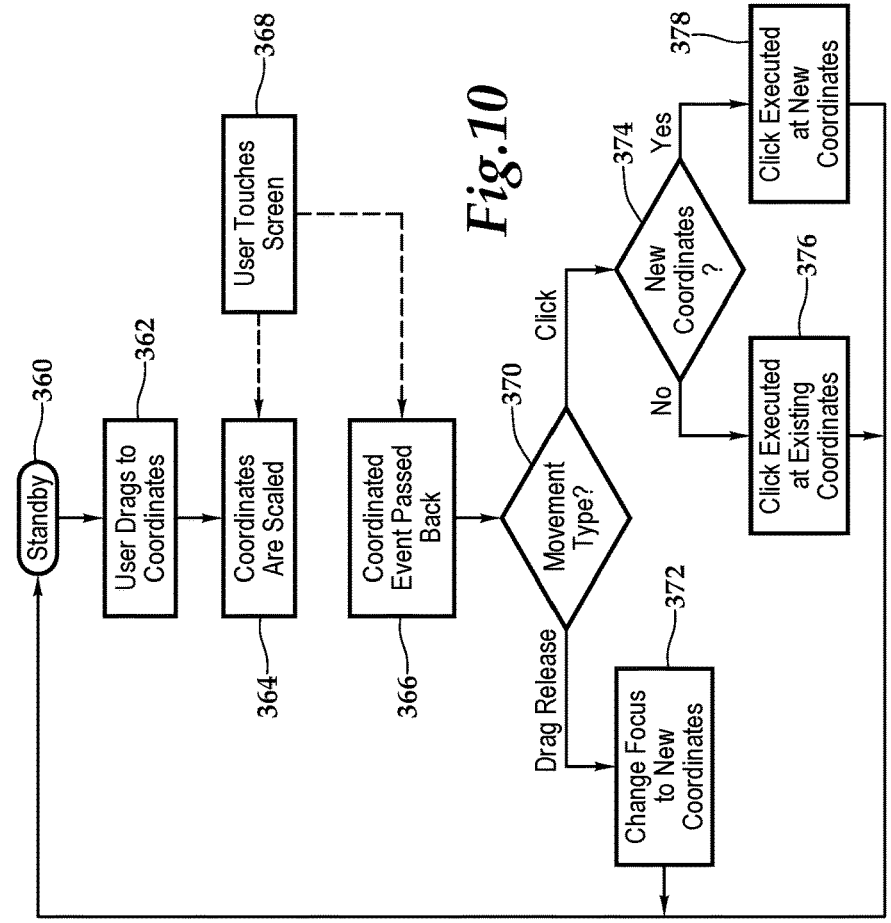

SET-TOP BOX WITH ENHANCED FUNCTIONALITY AND SYSTEM AND METHOD FOR USE OF SAME

PRIORITY STATEMENT & CROSS-REFERENCE TO RELATED APPLICATIONS

This application is a continuation of U.S. patent application Ser. No. 16/209,690 entitled "Set-Top Box with Enhanced Functionality and System and Method for Use of Same" filed on Dec. 4, 2018, in the names of William C. Fang et al., now U.S. Pat. No. 10,791,359 issued on Sep. 29, 2020; which claims priority from U.S. patent application Ser. No. 15/990,358 entitled "Set-Top Box with Enhanced Functionality and System and Method for Use of Same" filed on May 25, 2018, in the names of William C. Fang et al., now U.S. Pat. No. 10,148,998 issued on Dec. 4, 2018; which claims priority from U.S. Patent Application Ser. No. 62/511,147 entitled "Set-Top Box with Enhanced Functionality and System and Method for Use of Same" filed on May 25, 2017, in the name of Vanessa Ogle; all of which are hereby incorporated by reference, in entirety, for all purposes. U.S. patent application Ser. No. 15/990,358 entitled "Set-Top Box with Enhanced Functionality and System and Method for Use of Same" filed on May 25, 2018, in the names of William C. Fang et al., now U.S. Pat. No. 10,148, 998 issued on Dec. 4, 2018 is also a continuation-in-part of U.S. patent application Ser. No. 15/857,310 entitled "Set Top/Back Box, System and Method for Providing a Remote Control Device" filed on Dec. 28, 2017, in the names of Vanessa Ogle et al., now U.S. Pat. No. 10,136,176 issued on Nov. 20, 2018; which is a continuation of U.S. application Ser. No. 15/422,667 entitled "Set-Top/Back Box, System and Method for Providing a Remote Control Device" filed on Feb. 2, 2017, in the names of Vanessa Ogle et al. now U.S. Pat. No. 10,187,685 issued on Jan. 22, 2019; which is a continuation of U.S. patent application Ser. No. 15/162, 823 entitled "Set Top/Back Box, System and Method for Providing a Remote Control Device" filed on May 24, 2016, in the names of Vanessa Ogle et al.; which is a continuation of U.S. patent application Ser. No. 14/876,571 entitled "Set Top/Back Box, System and Method for Providing a Remote Control Device" filed on Oct. 6, 2015, in the names of Vanessa Ogle et al., now U.S. Pat. No. 9,351,029 issued on May 24, 2016; which is a continuation of U.S. patent application Ser. No. 14/525,392 entitled "Set Top/Back Box, System and Method for Providing a Remote Control Device" filed on Oct. 28, 2014, in the names of Vanessa Ogle et al., now U.S. Pat. No. 9,154,825 issued on Oct. 6, 2015; which is a continuation of U.S. patent application Ser. No. 14/177,876 entitled "Set Top/Back Box, System and Method for Providing a Remote Control Device" filed on Feb. 11, 2014, in the names of Vanessa Ogle et al., now U.S. Pat. No. 8,875,195 issued on Oct. 28, 2014; which is a continuation of U.S. application Ser. No. 13/528,663 entitled "Set Top/ Back Box, System And Method For Providing A Remote Control Device" filed on Jun. 20, 2012, in the names of Vanessa Ogle et al., now U.S. Pat. No. 8,650,600 issued on Feb. 11, 2014; which claims priority from U.S. Patent Application Ser. No. 61/498,734, entitled "Set Top/Back Box, System and Method for Providing a Remote Control Device" and filed on Jun. 20, 2011, in the names of Vanessa Ogle et al.; all of which are hereby incorporated by reference, in entirety, for all purposes.

TECHNICAL FIELD OF THE INVENTION

This invention relates, in general, to set-top boxes and, in particular, to set-top boxes with enhanced functionality and systems and methods for use of the same that address and enhance the functionality provided between a set-top box and a display or television, for example.

BACKGROUND OF THE INVENTION

To many individuals, a television is more than just a display screen, rather it is a doorway to the world, both real and imaginary, and a way to experience new possibilities and discoveries. Consumers are demanding enhanced content in an easy-to-use platform. As a result of such consumer preferences, the quality of content and ease-of-use are frequent differentiators in determining television experiences, particularly in multi-television environments. Remote controls are now considered a necessary part of ease-of-use for operating television devices wirelessly from a short line-of-sight distance without the need to approach the television. Remote controls are usually small wireless handheld objects with an array of buttons for adjusting various settings such as television channel and volume. These devices have limited functionality and, as a result, there is a continuing need for improved remote controls that enhance ease-of-use.

SUMMARY OF THE INVENTION

It would be advantageous to achieve a remote control that would improve upon existing limitations in functionality. It would also be desirable to enable a wireless-based solution that would improve ease-of-use for remote control functionality in multi-display or multi-television environments. To better address one or more of these concerns, set-top boxes are disclosed with enhanced functionality and systems and methods for use of the same that address and enhance the functionality provided between a set-top box and a display or television, for example. In one embodiment of the set-top box system, first and second set-top boxes each include a housing securing a television input, a television output, a processor, a wireless transceiver, memory, and storage communicatively interconnected by a busing architecture. Each of the set-top boxes is connected to a display, such as a television. A syndication profile associated with the set-top boxes enables a proximate wireless-enabled interactive programmable device to control both displays via each of the set-top boxes. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 2A is a schematic diagram depicting one operational embodiment of the system of FIG. 1 within a multi-display environment;

FIG. 2B is a schematic diagram depicting another operational embodiment of the system of FIG. 1 within a multi-display environment;

FIG. 2C is a schematic diagram depicting a further operational embodiment of the system of FIG. 1 within a multi-display environment;

FIG. 10 is a flow chart diagram depicting one embodiment of a method for user touch panel display command execution; and FIG. 11 is a flow chart depicting one embodiment of a method for providing a remote control device, according to the teachings presented herein.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1:
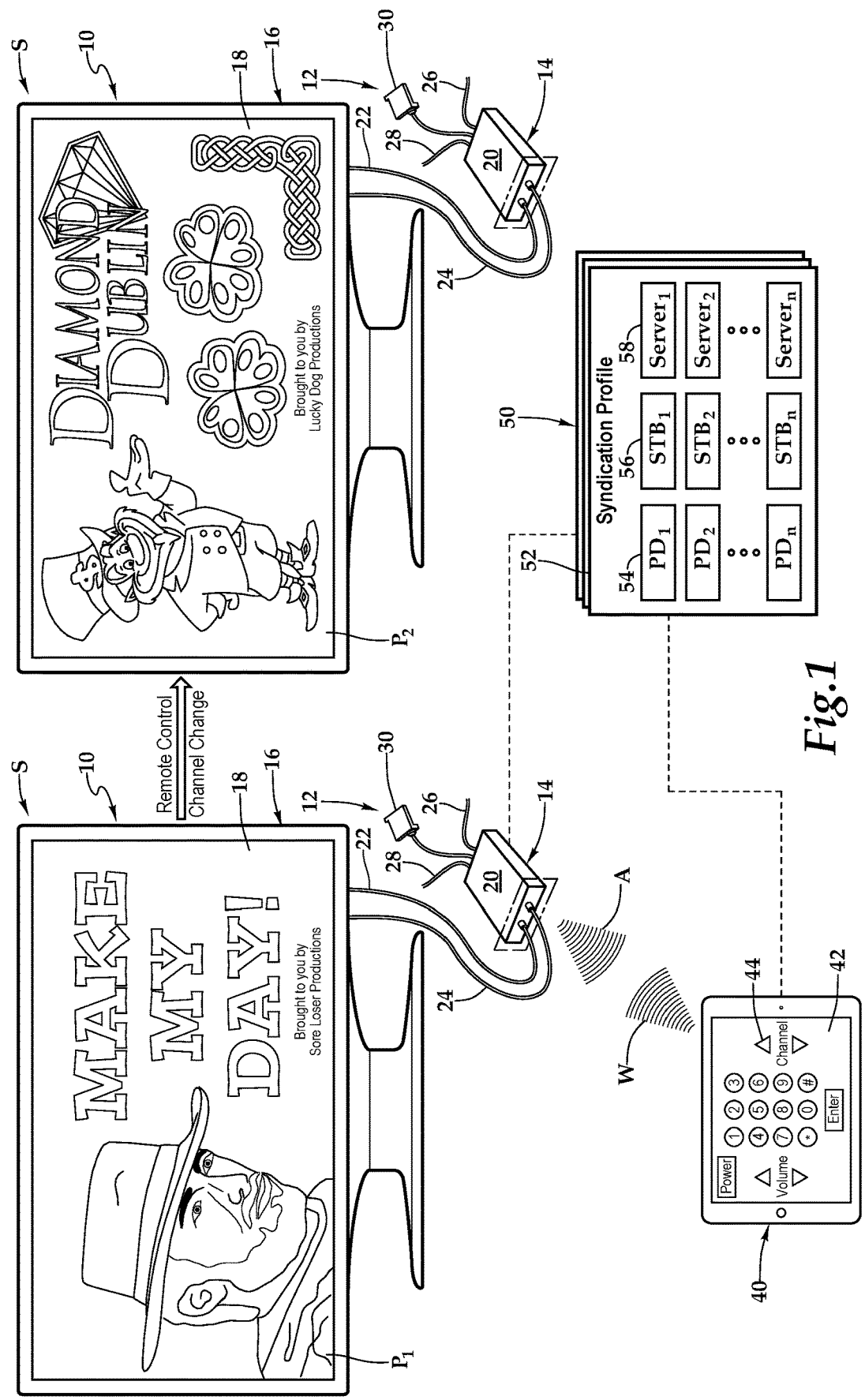
FIG. 1 is a schematic diagram depicting one embodiment of a system for providing enhanced set-top box functionality according to the teachings presented herein.
Figure 3A:
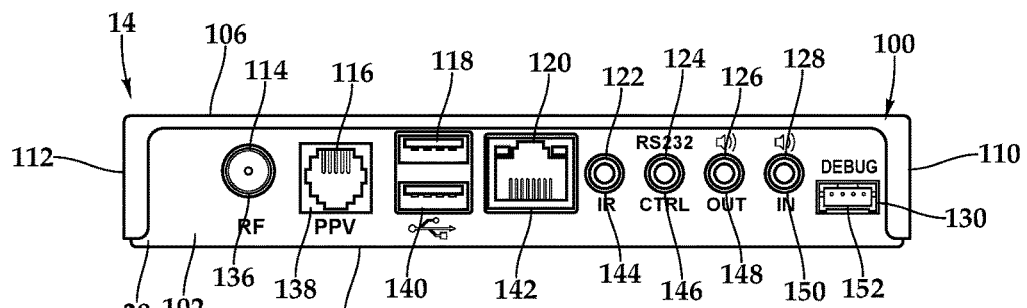
FIG. 3A is a wall-facing exterior elevation view of one embodiment of the set-top box depicted in FIG. 1 in further detail.
Figure 3B:
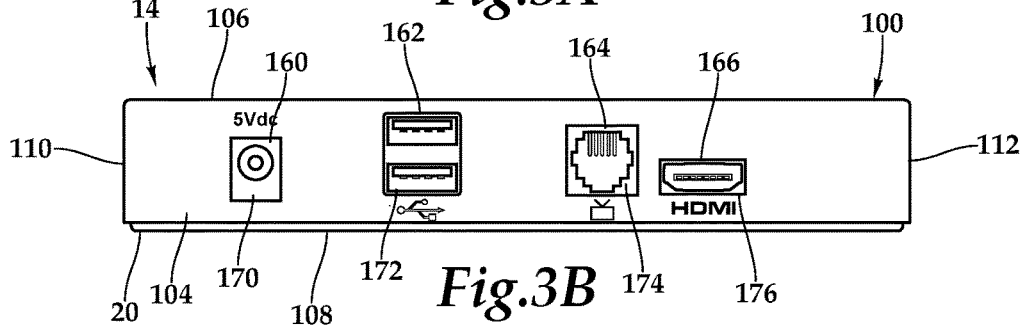
FIG. 3B is a television-facing exterior elevation view of the set-top box depicted in FIG. 1.
Figure 3C:
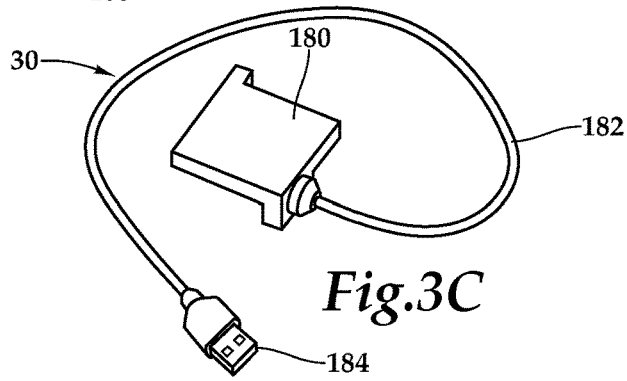
FIG. 3C is a front perspective view of a dongle depicted in FIG. 1 in further detail.
Figure 4:
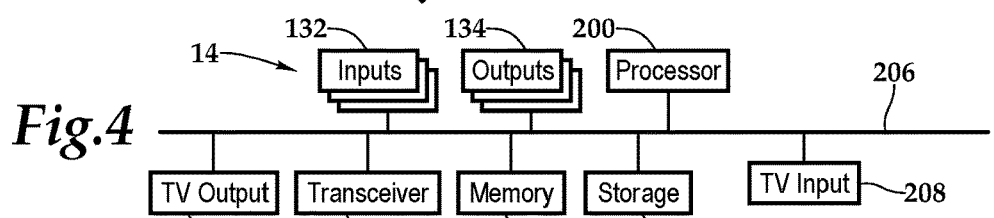
FIG. 4 is a functional block diagram depicting one embodiment of the set-top box presented in FIGS. 3A and 3B.

Referring initially to FIG. 1, therein is depicted one embodiment of a system 10 for addressing and enhancing the functionality provided a multi-display environment S. An entertainment center 12 includes a set-top box 14. As shown, the display 16 is depicted as a television having a screen 18, which is showing program $P_1$. It should be appreciated however, that the display 16 may also be any electronic visual display device, for example. Entertainment centers, like the entertainment center 12, may be deployed throughout the multi-display environments, which may be a lobby, sports bar or other gathering place, for example. The entertainment center 12 is depicted as including the set-top box 14 and the display 16. It should be appreciated however that the entertainment center 12 may include any combination of electronic appliances, components, and devices and, in particular, any combination of electronic appliances, components, and devices found in multi-display environments.

As shown, with respect to the set-top box 14 having a housing 20, and the display 16, a connection, which is depicted as an HDMI connection 22, connects the set-top box 14 to the display 16. Other connections include a power cable 24 coupling the set-top box 14 to a power source, a coaxial cable 26 coupling the set-top box 14 to an external cable source, and a category five (Cat 5) cable 28 coupling the set-top box 14 to an external pay-per-view source. As shown, the set-top box 14 may include a dongle 30 providing particular technology and functionality extensions thereto. That is, the set-top box 14 may be a set-top box-dongle combination in one embodiment. More generally, it should be appreciated that the cabling connected to the set-top box 14 will depend on the environment and application, and the cabling connections presented in FIG. 1 are depicted for illustrative purposes. Further, it should be appreciated that the positioning of the set-top box 14 will vary depending on environment and application and, with certain functionality, the set-top box 14 may be placed more discretely behind the display 16. Moreover, it should be appreciated that the set-top box 14 and the display 16 may be at least partially or fully integrated. The set-top box 14 communicates wirelessly, as indicated by wireless signaling W, with a proximate wireless-enabled interactive programmable device 40 that is illustrated as a tablet computer having a touch screen display 42 showing various buttons 44. Although a tablet computer is depicted, the proximate wireless-enabled interactive programmable device 40 may be a personal computer, laptop, smart phone, or smart watch, for example.

Syndication profiles 50 are associated with the set-top box 12 and other set-top boxes coupled to respective displays. With respect to syndication profile 52, which forms a portion of the syndication profiles 50, the syndication profile 52 enables the proximate wireless-enabled interactive programmable device 40 to control the display 16 via the set-top box 14 and, as will be discussed in further detail hereinbelow, the proximate wireless-enabled interactive programmable device 40 is able to control other displays. That is, in one embodiment, the syndication profile 52 provides that a single instance of the virtual remote control functionality from the proximate wireless-enabled interactive programmable device 40 controls multiple displays. The syndication profile 52 may be at least partially saved in memory of each set-top box. Further, as shown, the syndication profile 52 includes data on subscribers, such as proximate wireless-enabled interactive programmable device data 54, which includes the proximate wireless-enabled interactive programmable device 40, set-top box data 56, which includes the set-top box 14, and various server data 58 relative to servers associated with the set-top boxes of set-top box data 56. In operation, the syndication profile 52 is utilized by the proximate wireless-enabled interactive programmable device 40 and the set-top box 12 to enable a remote control operation, such as the illustrated channel change with wireless signal W from the proximate wireless-enabled interactive programmable device 40. In particular, the proximate wireless-enabled interactive programmable device 40 is within area A of the set-top box 14. A pairing is then established between the proximate wireless-enabled interactive programmable device 40 and the set-top box 14. Following the pairing, the proximate wireless-enabled interactive programmable device 40 has remote control functionality as shown on the touchscreen display 42 with various buttons 44. As shown, utilizing the various buttons 44, the wireless signal W is sent from the proximate wireless-enabled interactive programmable device 40 to the set-top box 14. A channel change operation for the program $P_1$ to a program $P_2$ is then effectuated. It should be appreciated that other remote control operations may be effectuated too, such as volume adjustment or change in power state, for example.

Moreover, on the multi-display environment S, the wireless signal W may contain multiple displays.

Referring to FIGS. 2A, 2B, and 2C, multiple embodiments of the system 10 are depicted including a server 80 that may be co-located in the multi-display environment S with the entertainment centers 12-1 . . . 12-$n$. As shown, each of the entertainment centers 12-1 . . . 12-$n$ may respectively include set-top boxes 14-1 . . . 14-$n$ and displays 16-1 . . . 16-$n$. Also, as shown, the server 80 includes a housing 82 having various components and software therein as will be discussed hereinbelow, including in FIG. 5. The server 80 receives outside content from content sources 84 for distribution to the displays 16-1 . . . 16-$n$ via the set-top boxes 14-1 . . . 14-$n$. The proximate wireless-enabled interactive programmable device 40 is being utilized to perform a remote control operation, such as a channel change or volume adjustment, on a portion of the displays 16-1 . . . 16-$n$.

Referring now to FIG. 2A, in one embodiment, by way of the syndication profile 52, a proximate wireless-enabled interactive programmable device 40 is being utilized to change the channel at display 16-1 and display 16-$n$ as both of these displays share a common syndication profile. The display 16-2 is on a different syndication profile and may show a different program. As illustrated, the wireless signal W from the proximate wireless-enabled interactive programmable device 40 is received by set-top box 14-1 which is associated with the display 16-1 and received by the set-top box 14-$n$ which is associated with the display 16-$n$. In accordance with the signalization, the channel is changed at display 16-1 and the display 16-$n$ as indicated by reference $C_W$. Therefore, the wireless signal W provides a single instance of the virtual remote control functionality input instructions controlling the set-top box 14-1 and the set-top box 14-$n$.

Referring now to FIG. 2B, in one embodiment, by way of the syndication profile, the proximate wireless-enabled interactive programmable device 40 is being utilized to change the channel at the display 16-1 and the display 16-$n$ as both of these displays share a common syndication profile. The display 16-2 is on a different syndication profile and may show a different program. As illustrated, the wireless signal W from the proximate wireless-enabled interactive programmable device 40 is received by set-top box 14-1 which is associated with the display 16-1. In accordance with the signalization, the channel is changed at the display 16-1 as indicated by reference $C_W$. The set-top box 14-1 then sends out wireless signalization X, which is received by the set-top box 14-$n$, which is associated with the display 16-$n$. In accordance with the signalization, the channel is changed at the display 16-$n$ as indicated by reference C. Therefore, the wireless signal W provides a single instance of the virtual remote control functionality input instructions controlling the set-top box 14-1 and the set-top box 14-$n$.

Referring now to FIG. 2C, in one embodiment, by way of the syndication profile 52, the proximate wireless-enabled interactive programmable device 40 is being utilized to change the channel at display 16-1 and display 16-$n$ as both of these displays share a common syndication profile. The display 16-2 is on a different syndication profile and may show a different program. As illustrated, a wireless signal W from the proximate wireless-enabled interactive programmable device 40 is received by the set-top box 14-1 which is associated with the display 16-1. In accordance with the signalization, the channel is changed at the display 16-1 as indicated by reference $C_{W1}$. The set-top box 14-1 then sends out signalization command C, which is received by the server 80, and forwarded to the set-top box 14-$n$ associated with the display 16-$n$. In accordance with the signalization command C, the channel is changed at the display 16-$n$ as indicated by reference $C_C$. Therefore, the wireless signal $W_1$ provides a single instance of the virtual remote control functionality input instructions controlling the set-top box 14-1 and the set-top box 14-$n$.

Continuing to refer to FIG. 2C, following the channel change operation at set-top boxes 14-1, 14-$n$ with respective displays 16-1, 16-$n$, the proximate wireless-enabled interactive programmable device 40 accesses a second syndication profile that controls set-top box 14-2, which is associated with the display 16-2. A wireless signal $W_2$ from the proximate wireless-enabled interactive programmable device 40 is received by set-top box 14-2 and in accordance with the signalization, the channel is changed at the display 16-2 as indicated by reference $C_{W2}$. Accordingly, with respect to FIGS. 2A, 2B, and 2C, the signalization may travel from the proximate wireless-enabled interactive programmable device 40 directly to each of the appropriate set-top boxes in accordance with the syndication profile or indirectly through a set-top box-to-set-top box signalization or indirectly through a set-top box-to-server signalization. Further, each proximate wireless-enabled interactive programmable device 40 may have access to multiple syndication profiles providing for control of various groupings of set-top boxes and displays.

Referring to FIG. 3A, FIG. 3B, FIG. 3C, and FIG. 4, as used herein, set-top boxes, back boxes and set-top/back boxes may be discussed as set-top boxes. By way of example, the set-top box 14 may be a set-top unit that is an information appliance device that generally contains set-top box functionality including having a television-tuner input and displays output through a connection to a display or television set and an external source of signal, turning by way of tuning the source signal into content in a form that can then be displayed on the television screen or other display device. Such set-top boxes are used in cable television, satellite television, and over-the-air television systems, for example.

The set-top box 14 includes a housing 20 including a panel 100 and a rear wall 102, front wall 104, top wall 106, bottom base 108, and two sidewalls 110, 112. It should be appreciated that front wall, rear wall, and side wall are relative terms used for descriptive purposes and the orientation and the nomenclature of the walls may vary depending on application. The front wall includes various ports, ports 114, 116, 118, 120, 122, 124, 126, 128, and 130 that provide interfaces for various interfaces, including inputs and outputs. In one implementation, as illustrated, the ports 114 through 130 include inputs 132 and outputs 134 and, more particularly, an RF input 136, a RJ-45 input 138, universal serial bus (USB) input/outputs 140, an Ethernet category 5 (Cat 5) coupling 142, an internal reset 144, an RS232 control 146, an audio out 148, an audio in 150, and a debug/maintenance port 152. The front wall 104 also includes various inputs 132 and outputs 134. More particularly, ports 160, 162, 164, and 166 include a 5V dc power connection 170, USB inputs/outputs 172, an RJ-45 coupling 174, and an HDMI port 176. It should be appreciated that the configuration of ports may vary with the set-top box depending on application and context. As previously alluded to, the housing 20 may include a housing-dongle combination including, with respect to the dongle 30, a unit 180 having a cable 182 with a set-top box connector 184 for selectively coupling with the set-top box 14.

Within the housing 20, a processor 200, memory 202, storage 204, the inputs 132, and the outputs 134 are interconnected by a bus architecture 206 within a mounting architecture. It should be understood that the processor 200, the memory 202, the storage 204, the inputs 132, and the outputs 134 may be entirely contained within the housing 20 or the housing-dongle combination. The processor 200 may process instructions for execution within the computing device, including instructions stored in the memory 202 or in storage 204. The memory 202 stores information within the computing device. In one implementation, the memory 202 is a volatile memory unit or units. In another implementation, the memory 202 is a non-volatile memory unit or units. Storage 204 provides capacity that is capable of providing mass storage for the set-top box 14. The various inputs 132 and outputs 134 provide connections to and from the computing device, wherein the inputs 132 are the signals or data received by the set-top box 14, and the outputs 134 are the signals or data sent from the set-top box 14. A television content signal input 208 and a television output 210 are also secured in the housing 20 in order to receive content from an external source and forward the content, including external content such as cable and satellite and pay-per-view (PPV) programing, to the display, which may be a television.

A transceiver 212 is associated with the set-top box 14 and communicatively disposed with the bus 206. As shown the transceiver 212 may be internal, external, or a combination thereof to the housing. Further, the transceiver 212 may be a transmitter/receiver, receiver, or an antenna for example. Communication between various amenities in the multi-display environment S and the set-top box 14 may be enabled by a variety of wireless methodologies employed by the transceiver 212, including 802.11, 3G, 4G, Edge, WiFi, ZigBee, near field communications (NFC), Bluetooth low energy and Bluetooth, for example. Also, infrared (IR) may be utilized.

The memory 202 and storage 204 are accessible to the processor 200 and include processor-executable instructions that, when executed, cause the processor 200 to execute a series of operations. In one embodiment, the processor-executable instructions cause the processor 200 to specify a search operation to identify the proximate wireless-enabled interactive programmable device 40. The search operation may utilize the wireless transceiver to wirelessly identify the proximate wireless-enabled interactive programmable device 40. The processor-executable instructions may then cause the processor 200 to establish a pairing between the proximate wireless-enabled interactive programmable device 40 and the set-top box 14. Further, the processor 200 may be caused to provide instructions for virtual buttons on a touch screen display associated with the proximate wireless-enabled interactive programmable device 40 such that the virtual buttons are associated with the proximate wireless-enabled interactive programmable device 40. The processor-executable instructions may include instructions to cause the processor 200 to receive and process virtual remote control functionality input instructions from the proximate wireless-enabled interactive programmable device 40.

Following receipt and process of the virtual remote control functionality input instructions, the processor 200 may be caused to evaluate the functionality input instructions to assign a meaning, generate a command signal, and send the command signal to the display. The memory 202 may further include processor-executable instructions that, when executed, cause the processor 200 to send formatted parallel audiovisual experience instructions to the proximate wireless-enabled interactive programmable device 40. The formatted parallel audiovisual experience instructions may be configured to provide a downstream parallel experience related to the content on the display. The processor-executable instructions may cause the processor 200 to send the signalization to another set-top box where processor-executable instructions may cause the processor 200 to receive signalization associated with the syndication profile 52 and send the command signal to the display associated with the set-top box.

Figure 5:
FIG. 5 is a functional block diagram depicting one embodiment of a server presented in FIGS. 2A through 2C.

Referring now to FIG. 5, one embodiment of the server 80 as a computing device includes a processor 230, memory 232, storage 234, inputs 236, outputs 238, and a network adaptor 240 interconnected with various buses 242 in a common or distributed, for example, mounting architecture. In other implementations, in the computing device, multiple processors and/or multiple buses may be used, as appropriate, along with multiple memories and types of memory. Further still, in other implementations, multiple computing devices may be provided and operations distributed therebetween. The processor 230 may process instructions for execution within the server 80, including instructions stored in the memory 232 or in storage 234. The memory 232 stores information within the computing device. In one implementation, the memory 232 is a volatile memory unit or units. In another implementation, the memory 232 is a non-volatile memory unit or units. Storage 234 includes capacity that is capable of providing mass storage for the server 80. Various inputs 236 and outputs 238 provide connections to and from the server 80, wherein the inputs 236 are the signals or data received by the server 80, and the outputs 238 are the signals or data sent from the server 80. The network adaptor 240 couples the server 80 to a network such that the server 80 may be part of a network of computers, a local area network (LAN), a wide area network (WAN), an intranet, a network of networks, or the Internet, for example.

The memory 232 and storage 234 are accessible to the processor 230 and include processor-executable instructions that, when executed, cause the processor 230 to execute a series of operations. In one embodiment, the processor-executable instructions cause the processor 230 to receive a signalization from one set-top box and forward the signalization to one or more other set-top boxes.

Figure 6:
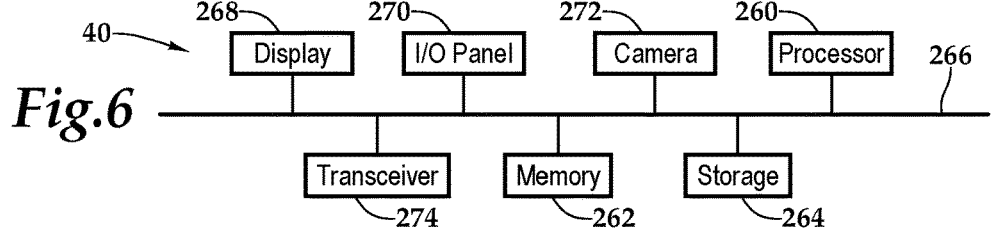
FIG. 6 is a functional block diagram depicting one embodiment of a programmable device presented in FIGS. 2A through 2C.

FIG. 6 shows one embodiment of the proximate wireless-enabled interactive programmable device 40 as a computing device, which includes a processor 260, memory 262, and storage 264 interconnected with a bus 266. A display 268, I/O panel, 270, camera 272, and transceiver 274 are also connected to the bus 266. The wireless-enabled interactive programmable device 40 may be a wireless communication device of the type including various fixed, mobile, and/or portable devices. As mentioned, the wireless-enabled interactive programmable device 40 may be a personal computer, laptop, tablet computer, smart phone, or smart watch, for example. The transceiver 274 may be configured to communicate with the set-top box, for example, via a standard selected from the group consisting of infrared (IR), 802.11, 3G, 4G, Edge, Wi-Fi, ZigBee, near field communications (NFC), Bluetooth, and Bluetooth low energy. It should be appreciated that although a particular architecture is explained, other designs and layouts are within the teachings presented herein.

In operation, the teachings presented herein permit the wireless-enabled interactive programmable device 40, such as a smart phone, tablet computer or laptop, to be utilized as an intelligent remote control device to interactively communicate with one or more set-top boxes operate respective displays, such as televisions. In the operation embodiment being described, the proximate wireless-enabled interactive programmable device 40 may be "paired" on a temporary basis to one or more of the set-top boxes. The proximate wireless-enabled interactive programmable device 40 may communicate via the set-top box(es) with the display(s).

The system and method may provide a menu-driven environment which may duplicate content on the television or provide remote controls for displays. Thus, the systems and methods disclosed herein may enable users to use existing electronic devices as a temporary remote control device to control multiple displays via respective set-top boxes. Therefore, the systems and methods presented herein avoid the need for additional or expensive high functionality remote controls. In this respect, the teachings presented herein also include providing the software and/or application for the proximate wireless-enabled interactive programmable device. The application, to the extent needed, may be downloaded from the Internet or alternatively made available by download from the set top/back box.

Figure 7:
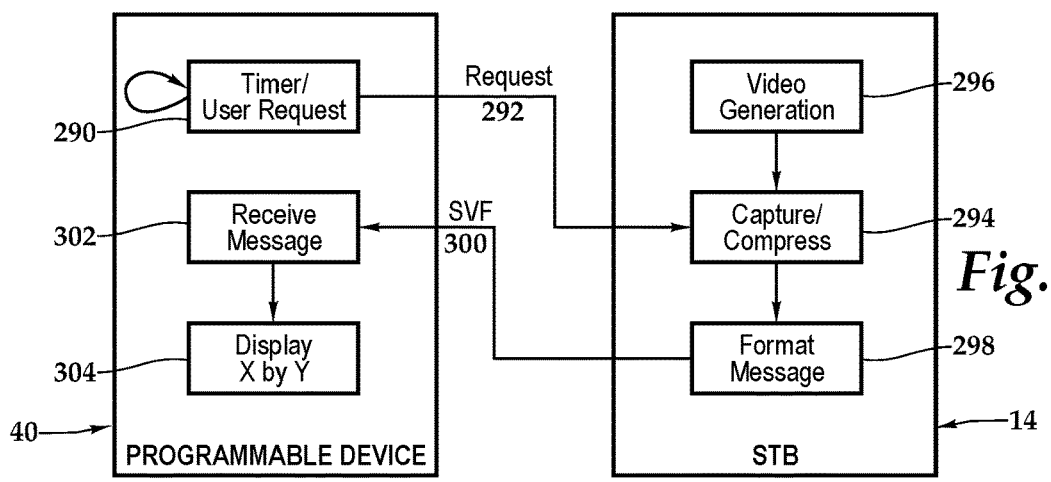
FIG. 7 is a schematic data flow diagram depicting one embodiment of single frame signaling between the set-top box and the programmable device.

Referring to FIG. 7, one embodiment of single frame signaling between the set-top box 14 and the proximate wireless-enabled interactive programmable device 40 is depicted. At operational module 290, a timer or user request generates a request 292 from the proximate wireless-enabled interactive programmable device 40, which is received by the capture/compress module 294 at the set-top box 14. The operational module 294 responsive thereto, receives a video generation signal from the operational module 296, which is $F_{output}$ ($X_{STB}$, $Y_{STB}$). This signal is forwarded to operational module 298, where the signal is formatted and/or scaled for particular the proximate wireless-enabled interactive programmable device 40, based on the pairing established between the set-top box 14 and the proximate wireless-enabled interactive programmable device 40. That is, the operational module 298 formats and/or scales the signal from $F_{output}$ ($X_{STB}$, $Y_{STB}$) with individual pixels being ($X_{STB}$, $Y_{STB}$), to $F_{device}$ ($X_{PD}$, $Y_{PD}$), with individual pixels being ($X_{PD}$, $Y_{PD}$). The formatted and/or scaled signal $F_{device}$ ($X_{PD}$, $Y_{PD}$) is sent via signal video frame (SVF) signal 300 from the set-top box 14 and received at operational module 302, where the signal and message are received and displayed at operational module 304 on the touch screen display 268 with the I/O panel 270 of the proximate wireless-enabled interactive programmable device 40. In this manner, parallel audiovisual experience instructions are provided by the set-top box 14 to the proximate wireless-enabled interactive programmable device 40 to create a parallel experience, which as discussed previously, may include virtual buttons. It should be appreciated that the various operational modules described in FIG. 7 and herein may be executed by the hardware, software, and firmware architectures depicted in FIG. 6, for example.

Figure 8:
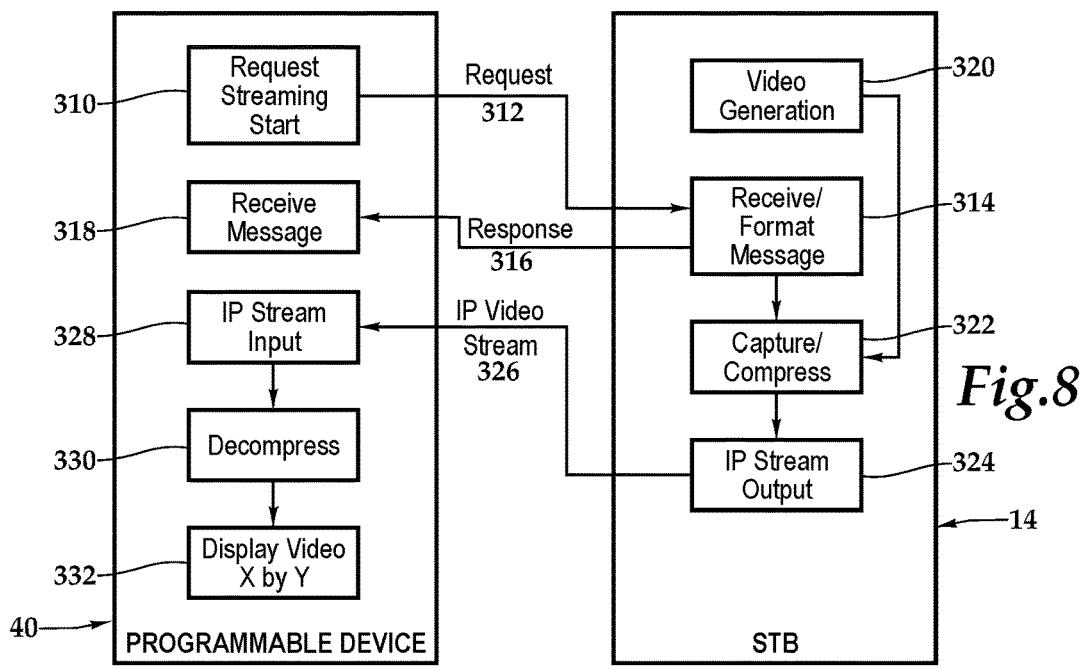
FIG. 8 is a schematic data flow diagram depicting one embodiment of streaming video between the set-top box and the programmable device having a touch panel display.

FIG. 8 depicts one embodiment of streaming video between the set-top box 14 and the proximate wireless-enabled interactive programmable device 40. At operational module 310 a request 312 originates from the proximate wireless-enabled interactive programmable device 40 and is received by operational module 314, where the message is received and a response 316 is transmitted back to the wireless-enabled interactive programmable device 40, indicating that the parameters. The response 316 is received at operational module 318. With reference again to the set-top box 14, an operational module 320 generates the streaming video, which is captured and compressed at operational module 322, prior to being formatted, in one embodiment, as an IP stream output at operational module 324. After transmission from the set-top box 14, the IP video stream 326 is received by the proximate wireless-enabled interactive programmable device 40 at operational module 328, and then decompressed at operational module 330 prior to being displayed at operational module 332. Similar to the discussion in FIG. 7, the formatting and scaling involves transforming $F_{output}$ ($X_{STB}$, $Y_{STB}$), with individual pixels being ($X_{STB}$, $Y_{STB}$), to $F_{device}$ ($X_{PD}$, $Y_{PD}$), with individual pixels being ($X_{PD}$, $Y_{PD}$) and reflecting a substantially real-time stream rate. In this manner, parallel audiovisual experience instructions are provided by the set-top box 14 to the wireless-enabled interactive programmable device 40 to create a parallel experience, which as discussed previously, may include virtual buttons.

Figure 9:
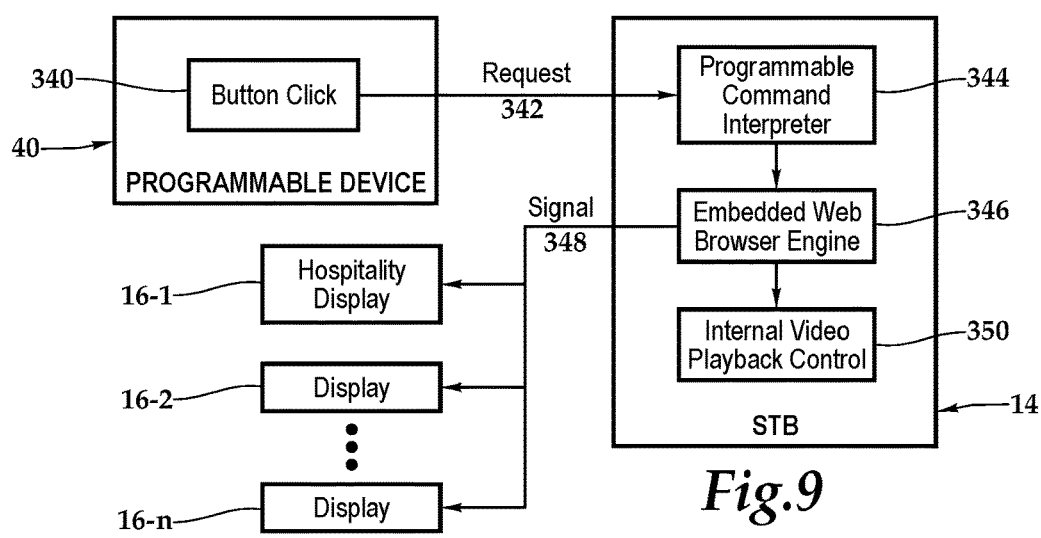
FIG. 9 is a schematic data flow diagram depicting one embodiment of control signaling between the set-top box and the programmable device.

FIG. 9 depicts one embodiment of control signaling between the set-top box 14 and the proximate wireless-enabled interactive programmable device 40. At the proximate wireless-enabled interactive programmable device 40, a button click or touch-and-click operation is detected at operational module 340, which then sends request 342. The button click may be associated with the actuation of a virtual button, which forms a portion of the parallel audiovisual experience. The set-top box 14 receives the request 342 and operational module 344 executes a programmable command interpreter based on a configuration profile to determine the individual pixels ($X_{STB}$, $Y_{STB}$) associated with touch-and-click operation at ($X_{PD}$, $Y_{PD}$). Based on the parallel audiovisual instructions sent from the set-top box 14 and the received location of the touch-and-click operation, the operational module 344 determines the command and amenity associated with the actuation of the virtual button actuation on the proximate wireless-enabled interactive programmable device 40. In the particular illustrated embodiment, at operational module 346, an embedded web browser engine 346, working with operational module 350, which handles internal video playback control, forwards a command signal 348 to the appropriate displays 16-1, 16-2, . . . , 16-n.

FIG. 10 depicts one embodiment of a method for user touch panel display command execution. At block 360, the methodology is in standby. At block 362, a user drags his or her finger to particular coordinates on the touch screen display of the proximate wireless-enabled interactive programmable device. At block 364, the event is transmitted from the programmable device and received by the set-top box, where the coordinates are translated from the proximate wireless-enabled interactive programmable device coordinates to the set-top box coordinates. At block 366, the event is passed back to the programmable device and continued to be monitored. As shown by the dashed lies from block 368, it should be understood that during this process the user may continue to touch the screen.

At decision block 370, the movement type is determined and if a drag release occurred (block 372), then the focus of the methodology changes to the new coordinates. On the other hand, if a click movement occurs, then at decision block 374, the methodology forms a tree depending on whether or not the click occurred at existing coordinates (block 376) or new coordinates (block 378). These events are monitored for proper reporting to the set-top box 14 from the wireless-enabled interactive programmable device 40 of the location and type of touch-and-click operation, which may include a drag and/or release, occurs.

FIG. 11 depicts one embodiment of a method for providing a remote control device, according to the teachings presented herein. At block 390, the process begins before at block 392, the proximate wireless-enabled interactive programmable device is configured to provide a parallel audiovisual experience. In one implementation, this may involve using an existing application on the programmable device, such as a browser, or downloading a new application. At block 394, a search, which may be active or passive, is performed by the set-top box to identify a physically present and proximate wireless-enabled interactive programmable device 40 in the multi-display environment. At block 396, a pairing is established prior to a scalable parallel audiovisual experience being provided at block 398 on the touch screen display of the proximate wireless-enabled interactive programmable device. The audiovisual experience is parallel to the television experience being provided by the set-top box. As noted by block 400, this experience may include providing virtual buttons integrated within the audiovisual experience or two or more panels within the touch screen display showing the television experience and one or more virtual remote controls. As previously discussed, the virtual remote controls and buttons each correspond to amenities under the control of the set-top box.

At block 402, command coordinates are received from the programmable device at the set-top box and these command coordinates are translated into a command signal at block 404 intended for one or more displays associated with the respective set-top boxes based on the location of the touch-and-click operation, which more generally may be understood as a user interaction, and the parallel experience being provided by the set-top box to the wireless-enabled interactive programmable device. At block 406, the command is sent from the appropriate set-top boxes to the displays. In one embodiment, at decision block 408, the methodology may perform a set-top-box-to-set-top-box signalization check or a server-based signalization check. With respect to the set-top-box-to-set-top-box signalization check at block 410, a set-top box sends a confirming command to all the other set-top boxes to ensure all set-top boxes within the same synchronization profile received the command. On the other hand, at block 412, a server sends a confirming command to all the other set-top boxes to ensure all set-top boxes within the same synchronization profile received the command. Following both blocks 410 and 412, the process ends at block 414.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A set-top box system comprising:
a first set-top box including:
a housing securing a television input, a television output, a processor, memory, and storage therein,
a busing architecture communicatively interconnecting the television input, the television output, the processor, the memory, and the storage,
a wireless transceiver associated with the housing and coupled to the busing architecture, the wireless transceiver operable to communicate with a proximate wireless-enabled interactive programmable device,
the television input configured to receive a source signal from an external source,
the television output configured to forward a fully tuned signal to a first display, and
the memory accessible to the processor, the memory including processor-executable instructions that, when executed, cause the processor to:
establish a pairing between the proximate wireless-enabled interactive programmable device and the first set-top box,
receive and process virtual remote control functionality input instructions from the proximate wireless-enabled interactive programmable device,
evaluate the virtual remote control functionality input instructions to assign a meaning,
generate a command signal, and
send the command signal to the first display;
a syndication profile associated with the first set-top box and a second set-top box that enables the proximate wireless-enabled interactive programmable device to control the first display via the first set-top box and a second display via the second set-top box; and
the second set-top box including:
a housing securing a television input, a television output, a processor, memory, and storage therein,
a busing architecture communicatively interconnecting the television input, the television output, the processor, the memory, and the storage,
a wireless transceiver associated with the housing and coupled to the busing architecture, the wireless transceiver operable to communicate with a proximate wireless-enabled interactive programmable device,
the television input configured to receive a source signal from an external source,
the television output configured to forward a fully tuned signal to the second display, and
the memory accessible to the processor, the memory including processor-executable instructions that, when executed, cause the processor to:
receive signalization associated with the syndication profile, and
send the command signal to the second display;
wherein, with respect to the second set-top box, the signalization further comprises signalization received from a server;
wherein the server receives the signalization from the first set-top box and formats the signalization for the second set-top box;
wherein the syndication profile is at least partially saved in the respective memory of the first and second set-top boxes;
wherein the housing further comprises a housing-dongle combination securing the television input, the television output, the processor, memory, storage, and an active sound control circuit portion therewith;
wherein the processor and the memory are distributed through the housing-dangle combination.

2. The set-top box system as recited in claim 1, wherein, with respect to the second set-top box, the signalization further comprises signalization received from the proximate wireless-enabled interactive programmable device.

3. The set-top box system as recited in claim 2, wherein the signalization received from the proximate wireless-enabled interactive programmable device is coincident with the virtual remote control functionality input instructions received at the first set-top box.

4. The set-top box system as recited in claim 2, wherein the signalization received from the proximate wireless-enabled interactive programmable device further comprises the virtual remote control functionality input instructions.

5. The set-top box system as recited in claim 2, wherein the signalization received from the proximate wireless-enabled interactive programmable device follows the virtual remote control functionality input instructions received at the first set-top box.

6. The set-top box system as recited in claim 1, wherein, with respect to the second set-top box, the signalization further comprises signalization received from the first set-top box.

7. The set-top box system as recited in claim 1, wherein, with respect to the first set-top box, the memory further comprises processor-executable instructions that, when executed, cause the processor to send the signalization to the second set-top box.

8. The set-top box system as recited in claim 1, wherein the syndication profile further comprises data on subscribers selected from the group consisting of set-top boxes, proximate wireless-enabled interactive programmable devices, and servers.

9. The set-top box system as recited in claim 1, wherein the proximate wireless-enabled interactive programmable device comprises a device selected from the group consisting of personal computers, laptops, tablet computers, smart phones, and smart watches.

10. The set-top box system as recited in claim 1, wherein the wireless transceiver is configured to communicate with the proximate wireless-enabled interactive programmable device via a standard selected from the group consisting of infrared (IR), 802.11, 3G, 4G, Edge, Wi-Fi, ZigBee, near field communications (NFC), Bluetooth, and Bluetooth low energy.

11. The set-top box system as recited in claim 1, wherein the first display and the second display comprise a television.

12. The set-top box system as recited in claim 1, wherein the display comprises an electronic visual display device.

13. A set-top box system comprising:
a first set-top box including:
a housing securing a television input, a television output, a processor, memory, and storage therein,
a busing architecture communicatively interconnecting the television input, the television output, the processor, the memory, and the storage,
a wireless transceiver associated with the housing and coupled to the busing architecture, the wireless transceiver operable to communicate with a proximate wireless-enabled interactive programmable device,
the television input configured to receive a source signal from an external source,
the television output configured to forward a fully tuned signal to a first display, and
the memory accessible to the processor, the memory including processor-executable instructions that, when executed, cause the processor to:
establish a pairing between the proximate wireless-enabled interactive programmable device and the first set-top box,
receive and process virtual remote control functionality input instructions from the proximate wireless-enabled interactive programmable device,
evaluate the virtual remote control functionality input instructions to assign a meaning,
generate a command signal, and
send the command signal to the first display;
a syndication profile associated with the first set-top box and a second set-top box that enables the proximate wireless-enabled interactive programmable device to control the first display via the first set-top box and a second display via the second set-top box; and
the second set-top box including:
a housing securing a television input, a television output, a processor, memory, and storage therein,
a busing architecture communicatively interconnecting the television input, the television output, the processor, the memory, and the storage,
a wireless transceiver associated with the housing and coupled to the busing architecture, the wireless transceiver operable to communicate with a proximate wireless-enabled interactive programmable device,
the television input configured to receive a source signal from an external source,
the television output configured to forward a fully tuned signal to the second display, and
the memory accessible to the processor, the memory including first processor-executable instructions that, when executed, cause the processor to:
receive signalization associated with the syndication profile,
send the command signal to the second display, and
the memory accessible to the processor, the memory including second processor-executable instructions that, when executed, cause the processor to:
establish a pairing between the proximate wireless-enabled interactive programmable device and the second set-top box,
receive and process virtual remote control functionality input instructions from the proximate wireless-enabled interactive programmable device,
evaluate the virtual remote control functionality input instructions to assign a meaning, generate a command signal, and
send the command signal to the second display;
wherein, with respect to the second set-top box, the signalization further comprises signalization received from a server;
wherein the server receives the signalization from the first set-top box and formats the signalization for the second set-top box;
wherein the syndication profile is at least partially saved in the respective memory of the first and second set-top boxes;
wherein the housing further comprises a housing-dongle combination securing the television input, the television output, the processor, memory, storage, and an active sound control circuit portion therewith;
wherein the processor and the memory are distributed through the housing-dongle combination.

14. The set-top box system as recited in claim 13, wherein, with respect to the second set-top box, the signalization further comprises signalization received from a server.

* * * * *